US007257816B2

(12) United States Patent
Kulp et al.

(10) Patent No.: US 7,257,816 B2
(45) Date of Patent: Aug. 14, 2007

(54) DIGITAL DATA PROCESSING APPARATUS AND METHODS WITH DYNAMICALLY CONFIGURABLE APPLICATION EXECUTION ON ACCELERATED RESOURCES

(75) Inventors: James Kulp, Arlington, MA (US); Graham P. Bardouleau, Chelmsford, MA (US); Ronald J. Gallerie, Middleton, MA (US); John E. Laundree, Dracut, MA (US); Raul E. Brauner, Framingham, MA (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 717 days.

(21) Appl. No.: 10/097,131

(22) Filed: Mar. 12, 2002

(65) Prior Publication Data

US 2003/0018690 A1    Jan. 23, 2003

Related U.S. Application Data

(60) Provisional application No. 60/275,204, filed on Mar. 12, 2001.

(51) Int. Cl.
*G06F 9/46* (2006.01)
*G06F 9/44* (2006.01)
*G06F 15/173* (2006.01)

(52) U.S. Cl. .................. 718/104; 719/316; 709/226
(58) Field of Classification Search ............... 718/104; 717/141; 709/225–226; 719/316
See application file for complete search history.

(56) References Cited

U.S. PATENT DOCUMENTS

| 4,695,945 | A | | 9/1987 | Irwin | 364/200 |
|---|---|---|---|---|---|
| 5,450,570 | A | | 9/1995 | Richek et al. | 395/500 |
| 5,732,270 | A | * | 3/1998 | Foody et al. | 719/316 |
| 5,748,980 | A | | 5/1998 | Lipe et al. | 395/828 |
| 5,793,979 | A | | 8/1998 | Lichtman et al. | |
| 5,815,715 | A | * | 9/1998 | Ku.cedilla.uk.cedilla.akar | 717/141 |
| 6,077,315 | A | | 6/2000 | Greenbaum et al. | 717/9 |
| 6,112,228 | A | * | 8/2000 | Earl et al. | 709/205 |

(Continued)

OTHER PUBLICATIONS

Hsiung et al., Object-Oriented technology transfer to multiprocessor system-level synthesis, Technology of Object-Oriented Language, 1997, TOOLS 24, Proceedings, Sep. 1997, pp. 284-293.

*Primary Examiner*—Meng-Al T. An
*Assistant Examiner*—Camquy Truong
(74) *Attorney, Agent, or Firm*—Nutter, McClennen & Fish LLP; David J. Powsner; Reza Mollaaghababa

(57) ABSTRACT

The invention provides, in one aspect, an improved digital data processing system of the type having a plurality of execution resources, including a central processing unit (CPU) and one or more further execution resources (or "components"). The improvement is characterized by a process executing on the central processing unit that selects portions of an applications program and effects their execution on one or more of the further execution resources, while effecting execution of remaining portions of the application on the CPU. The further execution resources, according to related aspects of the invention, can include co-processors, accelerators, controllers or other devices, of the "plug-and-play" variety or otherwise. They may provide specialized functionality for any of fast Fourier transforms, image reconstruction and synthetic aperture radar algorithms, to name a few. Those resources may be disposed locally or remotely with respect to the CPU.

33 Claims, 7 Drawing Sheets

U.S. PATENT DOCUMENTS

| | | | |
|---|---|---|---|
| 6,219,649 B1 | 4/2001 | Jameson | 705/8 |
| 6,237,786 B1 | 5/2001 | Ginter et al. | 213/153 |
| 6,256,773 B1 | 7/2001 | Bowman-Amuah | 717/1 |
| 6,321,366 B1 | 11/2001 | Tseng et al. | 716/6 |
| 6,389,470 B1 * | 5/2002 | Barr | 709/226 |
| 6,449,367 B2 | 9/2002 | Van Wie et al. | |
| 6,633,916 B2 | 10/2003 | Kauffman | |
| 6,636,901 B2 | 10/2003 | Sudhakaran et al. | |
| 6,816,882 B1 | 11/2004 | Conner et al. | |
| 2001/0039624 A1 | 11/2001 | Kellum | 713/201 |
| 2002/0188594 A1 | 12/2002 | Kulp et al. | |

\* cited by examiner

DIGITAL DATA PROCESSING APPARATUS AND METHODS WITH DYNAMICALLY CONFIGURABLE APPLICATION EXECUTION ON ACCELERATED RESOURCES

BACKGROUND OF THE INVENTION

This application claims benefit of priority under of U.S. provisional application Ser. No. 60/275,204 filed Mar. 12, 2001, the teachings of which are incorporated herein by reference.

The invention pertains to digital data processing and, more particularly, to methods and apparatus that facilitate implementation and execution of applications on multiprocessor computers and other digital data processing environments.

Virtually since the advent of the computer, applications programs have demanded greater resources than available with processor technologies of the day. One solution is the multiprocessor or multicomputer—e.g., a computer with multiple general-purpose processors or CPUs. Another solution is add-on accelleration hardware performing specialized functions, such as fast fourier transforms or the like. While both solutions have proven quite satisfactory, extensive interplay is sometimes required between the computer manufacturer and customer to optimize use of the additional resources by the customer's applications software.

This has given rise to resistance on the part of at least some customers to integrating specialized add-on hardware, in particular. There may be many reasons for this: short supply of programmers with the skill sets required to develop accelerated applications; the expense of software upgrades in view of interdependencies between customer and manufacturer components; and increased difficulties in porting, improving, and evolving customer-visible software as installed bases increase.

An object of this invention is to provide improved digital data processing methods and apparatus.

More particular objects are to provide such methods and apparatus as facilitate implementation and execution of applications on multiprocessor computers and in other digital data processing environments.

Another object of the invention is to provide such methods and apparatus as reduce the costs and risks traditionally associated with integrating applications and accelerator hardware or other additional resources.

Yet another object of the invention is to provide such methods and apparatus as are suited for object-oriented programming (OOP) and other applications.

Yet still another object of the invention is to provide such methods and apparatus as facilitate the development of parallel programming applications for multiprocessor and other digital data processing systems.

Still yet another object is to provide such methods and apparatus as can be implemented in existing and future multiprocessor and other computing environments.

SUMMARY OF THE INVENTION

The aforementioned objects are attained by the invention which provides, in one aspect, an improved digital data processing system of the type having a plurality of execution resources, including a central processing unit (CPU) and one or more further execution resources (or "components"). The improvement is characterized by a process executing on the central processing unit that selects or otherwise identifies portions of an applications program and effects their execution on one or more of the further execution resources, while effecting execution of remaining portions of the application on the CPU.

The further execution resources, according to related aspects of the invention, can include co-processors, accelerators, controllers or other devices, of the "plug-and-play" variety or otherwise. For example, a co-processor board having a processor, memory and other devices, as well as a field programmable gate array, can serve as one of the further execution resources. Regardless, the further execution may provide specialized functionality for any of fast Fourier transforms, image reconstruction and synthetic aperture radar algorithms, by way of non-limiting example. Or, they can be general purpose devices that gain functionality through downloadable instructions. Those resources may be disposed locally or remotely with respect to the CPU.

According to further aspects of the invention, a system as described above includes a store (or "client library") that identifies the further execution resources and for each, for example, its type, its interface and its configuration. The process, in related aspects, selects portions of the application for execution on the further resources as a function of the types identified in the store and, more particularly, for example, based on correspondence between those types and functional requirement of the portions of the application.

Further aspects of the invention provide systems as described above in which the process selects portions of the application for execution on the further resources at runtime or at substantially the same time that those portions are executed on the hardware accelerators or further execution resources.

In other aspects, the invention provides digital data processing systems as described above in which the process executing on the CPU invokes a proxy in place of each of the selected portions of the application. A framework or stream coprocessing engine (alternatively, "framework" or "SCE"), logically positioned between the process and the further execution resources, responds to the invoked proxies to perform functions on the further execution resources in lieu of those which would be performed by the CPU executing corresponding portions of the application—i.e., those in place of which the proxies were invoked. The framework can be a digital subsystem or subsystems executing on the CPU or on another processor in communication with the process executing on the CPU. Further, the framework can be implemented in hardware, software or firmware, or any combination of the three.

According to related aspects of the invention, the process generates each proxy with an identifier of the functional characterization of the one or more respective portions of the application in place of which it is invoked. The process can also generate each proxy with an identifier of a configuration of a further execution resource to be used to provide that functionality (or, put another way, to perform functions that would be performed by the CPU executing the corresponding one or more portions of the application). Further, a proxy object can contain information pertaining to the type and format of the data to which the functionality is to be applied, including by way of non limiting example, scaling, size and the type of the data. Related aspects of the invention provide for direct interface or other communication of the aforementioned information for allocation, configuration and application to the further execution resources without use of using proxy objects.

According to related aspects of the invention, the framework is provided with one or more further stores (referred to below as "descriptor objects"), each associated with one or more further execution resources and each providing a functional description and at least one configuration description of that associated resource. The framework, according to related aspects of the application, selects for allocation and configures the further execution resources based on the functional and configuration descriptions provided in corresponding store and on the functional and configuration characterization identified in the proxy.

Still further aspects of the invention provide a system as described above in which the process generates each proxy with data that is a function of that contained in the respective portions of the application. Thus, the proxy data can be identical to the original application data, or a scaled or otherwise modified form thereof. In related aspects, the framework applies the data from a proxy to one or more further execution resources in connection with invoking those resources to perform functions implicated by the proxy.

According to related aspects of the invention, the framework gathers information from prior invocations of the further execution resources, e.g., pertaining to throughput, data movement, latency and other performance characteristics. The framework can use this information, in order to select, configure and allocate the further resources to execute functions identified in the proxies.

Still other aspects of the invention provide a system as described above in which the framework applies information generated by an invoked further execution resource to one or more further such execution resources. In related aspects, the invention provides such a system wherein the framework stores to a proxy data generated by the further execution resources and in which the process utilizes data contained in the proxy in connection with executing the remaining portions of the application on the CPU.

Still further aspects of the invention provide methods of digital data processing operating in accord with the systems described above.

Advantages of such systems and methods include inter alia the ability to add further execution resources without the need for recompiling and/or relinking the applications program. To this end, the client library and/or descriptor objects can be modified to include new functionality and configurations, and also to include modifications such as updates to the further execution resources.

Another advantage of the invention is the ability to utilize further execution resources both locally, and through other communication methods, e.g. network accessible supercomputers, sub-systems, dedicated processors and the like. As such, application programs are not constrained to local resources, but can maximize remote components as well. The framework can poll components to determine the optimum set to utilize for a given application based on gathered criteria, e.g. data transfer speeds, loading factors, speed, or cost.

Systems and methods according to the invention have applicability in a variety of applications, including medical imaging, defense (e.g., multi-sensor-based Automatic Target Recognition and Tracking) and media streaming—to name only a few. Such systems provide flexibility to application authors to exploit co-processors and accelerated hardware/software without the need to "hard-code" interfaces, sealing and other component specific information.

The foregoing and other aspects of the invention, as well as of its advantages, are evident in the materials that follow.

BRIEF DESCRIPTION OF THE ILLUSTRATED EMBODIMENT

A more complete understanding of the invention may be attained by reference to the drawings, in which.

DETAILED DESCRIPTION OF THE ILLUSTRATED EMBODIMENT

Figure 1:
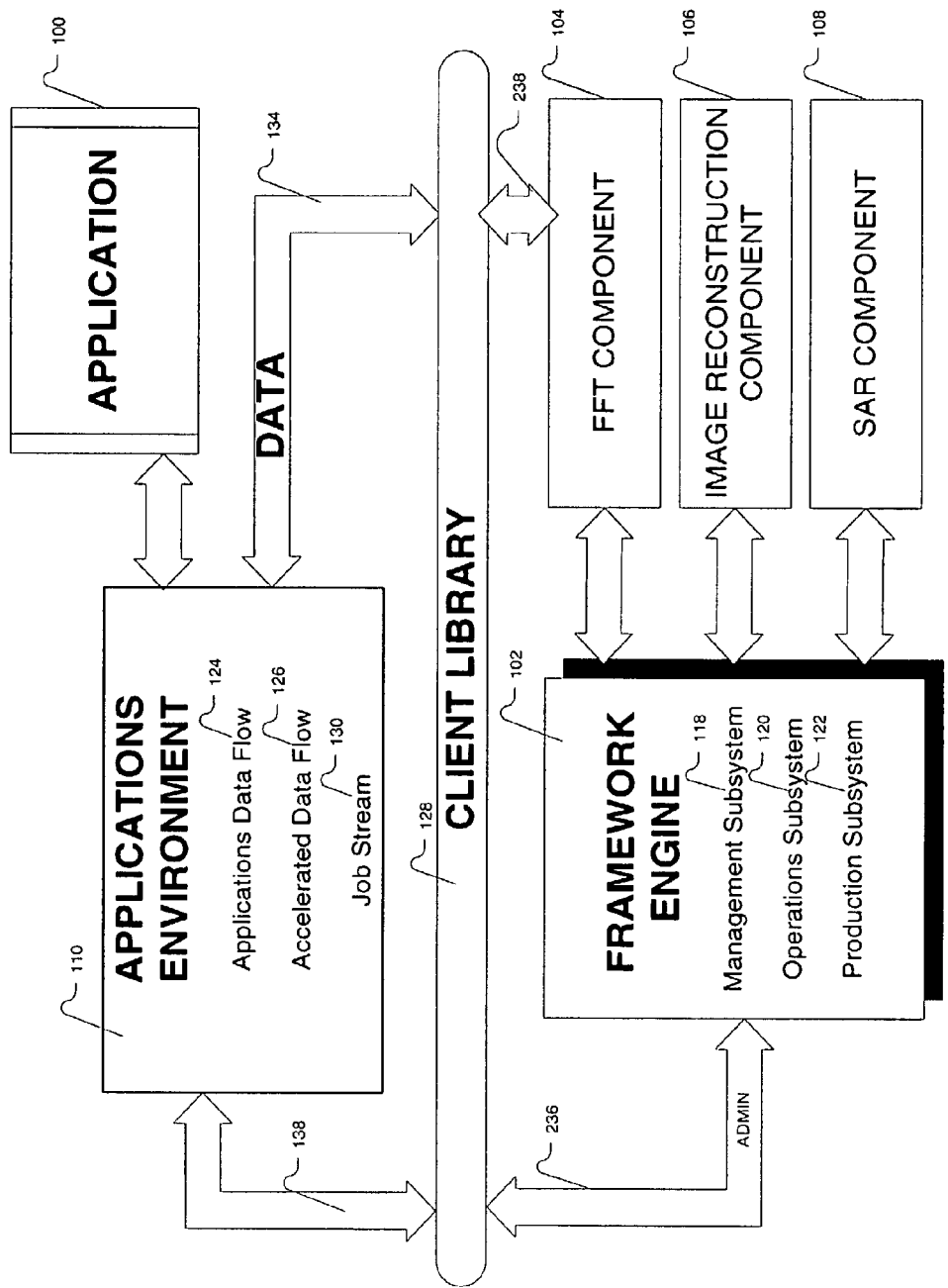
FIG. 1 is a functional block diagram of the illustrated embodiment depicting execution of application by a process, with portions that are passed to a framework for execution on accelerated components.

FIG. 1 depicts a system according to the invention for dynamically configurable application execution on accelerated resources. In the drawing, an applications program 100 ("application") is processed for execution in an applications environment 110 executing as a process on a central processing unit (hereinafter "CPU") (not shown). The application 100 represents any conventional computer program developed and implemented using standard programming techniques to execute within a host computing environment (not shown) of a conventional digital data processor or computer system, e.g., a mainframe, workstation, personal computer, and so forth. The application 100 can be developed using widely available programming tools and object oriented languages, e.g. C++, Ada, JAVA or Modula-3 among others. In the illustrated embodiment, the application 100 utilizes object-oriented programming (OOP) objects to represent embodied data and functions, though in other embodiments, the application 100 can be developed utilizing non-OOP languages, as well.

By way of overview, and as more fully discussed below, the application 100 is converted into and processed as an application data flow 124 wherein OOP objects or similar application objects or data strictures (collectively, "application objects") within the application 100 are organized as one or more directed graphs based on timing and data constraints among those objects. Although application objects are used here, it will be appreciated that any program segmentation technique can be used to create the data flow, for example, dynamic memory pages, object oriented programming objects, and sub-routines, to name a few.

The applications environment 110 accesses one or more client libraries 128 that contain, in some embodiments, administrative information 138 including functional characterizations and configuration characterizations of accelerated hardware or other resources (collectively, "components") 104, 106, 108 potentially available for execution of portions of the application. Using this information, application portions (here, those portions are objects, but in other data flow representations, those portions can consist of other discrete segments, e.g., index number range, sub-routines, code segments and the like) are selected that can be executed on the components 104, 106, 108 which perform the functionality that would have been performed by the application 100 executing on the CPU.

Continuing with an overview of system operation, these selected application objects are replaced by the proxy objects (or are otherwise represented according to the data flow representation used) and moved into one or more accelerated data flows 126. The data flows may include objects, but in some embodiments not shown here, the data flow may be subroutines, sub-processes or other portions of the application that supply functionality. The data flow can also include calls to library routines or other functions, and compiler directives that can be replaced by the components.

Here, proxy objects contain at least the administrative information gleaned from the client library 128 that match the functionality in the application 100 that was replaced, and the data to which that functionality is to be applied. The proxy objects establish communication among each other and any adjacent application objects such that the proxy objects will be instantiated instead of the portions of the application they have replaced. It will be appreciated by those skilled in the art that such a scheme results in the proxy objects appearing to the application 100 as native application objects, and further, that the selection of application portions and replacement of those portions is a function of information within the client library, and not a function of the application author hard-coding specific component information within the application.

The proxy objects within the accelerated data flow 126 are then organized as one or more accelerated job streams 130. Each job stream 130 consists of proxy objects that can be executed as streaming data among one or more of the components without the need for intervention by the application 100.

As the job streams 130 are invoked (e.g., a scheduled invocation of the group of proxy objects within a job stream), the applications environment 110 passes the proxy object's administrative information through an interface 138 to the client library 128, which in turn, interfaces 236 with a framework 102. In other non-illustrated embodiments, the applications 110 can directly interface with one or more executing frameworks. Further, the framework(s) 102 need not be local to the CPU, but can be in communication with the applications environment 110 via digital means Such as networking, bus communication or the like.

The framework 102 receives the administrative information via an interface 236 into a management subsystem 118. The management subsystem 118 accesses numerous data stores (or descriptor objects), each containing a detailed functional description of a component and at least one detailed configuration for that component. Using this information, the management subsystem 118 selects one or more configurations for the components 104, 106, 108 that can perform the functionality according the functional and configuration characterizations contained within the proxy objects, and allocates those components to the job stream 130.

The operations subsystem 120 receives the selection of components and configurations from the management subsystem 118 for each of those selected components. At the appropriate time (dependent upon the organization of the job stream), the operations subsystem 120 schedules one or more components and applies the received configuration to each scheduled component. Further, the operations subsystem 120 communicates information to a production subsystem for the movement of data between proxies in the job stream, and among the components.

The production subsystem 122 is responsible for the synchronization and movement of data in accordance with instructions received from the operations subsystem 120. The production subsystem 122 can move and synchronize data passed directly (or via the client library 128 using an interface 134 and in turn interface 238) from the job stream to the components, from one (or more) component to another (or more) component(s), and from one (or more) component(s) to the job stream (directly, or via the client library 128).

Although the framework here is illustrated as sub-systems, it will be appreciated by those skilled in the art that such functionality can also be implemented in hierarchical layers or otherwise, and still provide the functions described. Further, the layers can be otherwise divided into more (or less) layers (or sub-systems) and still satisfy the functional requirements.

It is appropriate here to note that although only three components 104, 106, 108 are illustrated, as will be seen and can be appreciated, numerous components, both local and remote to the CPU, can be utilized that can perform a wide variety of functions. In fact, components are any further execution resource (in the sense that the CPU is an execution resource and components are further resources in relation to the CPU), and can be implemented as software, hardware or firmware, or any combination of the three, including accelerated co-processor assemblies capable of performing functionality, including by way of non-limiting examples, Fast Fourier Transformations, image reconstructions and synthetic radar algorithms (SAR) to name a few. Further, the components may implement any functionality including algorithms, mathematical, digital or analog or a combination of any processing of functions. The components can be scalable in implementation, such that one component can perform a function with multiple configurations.

The framework 102 provides external interfaces to components, e.g. 104, 106 and 108, which can be located in distributed environments, e.g. locally, networked or otherwise in communication, that can be harnessed by applications 100 in a consistent, uniform way. For example, the interface to a 2-Dimensional (2D) FFT (hereinafter "2D-FFT") 104 can be supported by several implementations: one using the runtime host, another using a single PowerPC (PowerPC is a trademark of Motorola, Inc.), a third using 4 PowerPCs and still another using 16 PowerPC 750s. These four implementations are compatible with any application that uses the interface without changing, recompiling, relinking or otherwise handling the existing application 100.

The framework 102 also provides for the rapid addition of additional components as "plug-in" peripherals. Components 104, 106 and 108 are authored utilizing well-defined component packaging structures, consistent set of interfaces, and built-in services that perform essential operations such as Input-Output (hereinafter "I/O") and synchronization as described herein. The engine relieves the application author of most of the programming chores typically required in multi-processor environments.

In the illustrated embodiment, further execution resources are shown as components 104, 106 and 108 that appear as objects to the framework 102, but are software encapsulated accelerated hardware. As noted above, these may be co-processors, co-processor boards, accelerators, controllers or other devices, of the "plug-and-play" variety or otherwise. Moreover, they may provide specialized functionality for any of fast Fourier transforms, image reconstruction and synthetic aperture radar algorithms, by way of non-limiting example. Or, they can be general purpose devices that gain functionality through downloadable instructions. In the illustrated embodiment, the can be of any type that provide a common interface, e.g., a PowerPC, Pentium or other processor based device, or even a hybrid of a variety of processors. Those resources may be disposed locally or remotely with respect to the CPU.

When a proxy object is instantiated by the process 110, the framework 102 controls the tasking and assignment of the components 104, 106 and 108 for configuration of the hardware and thereby the execution the object within a dynamically configured accelerated computing environment.

Figure 2:
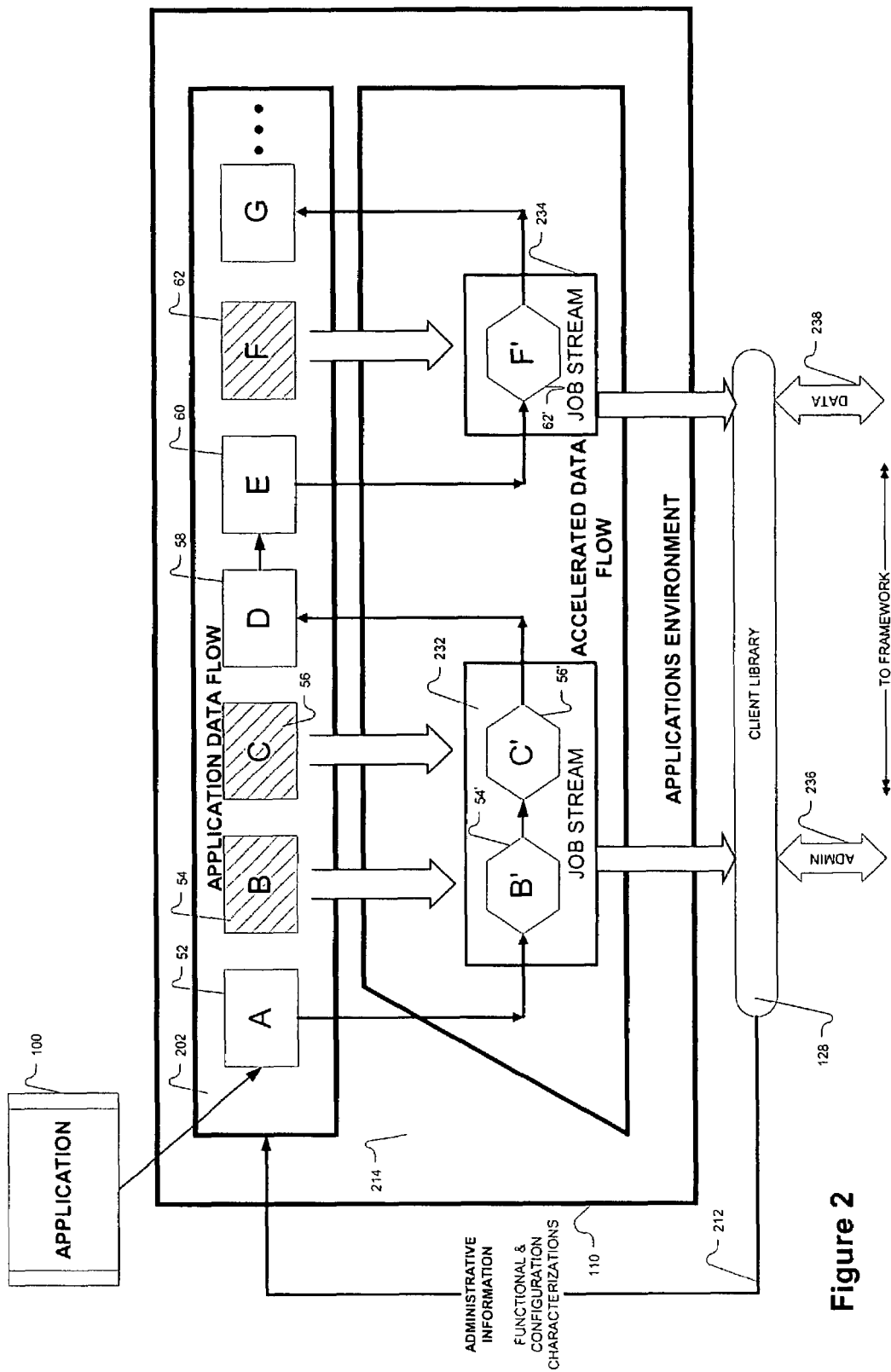
FIG. 2 depicts an applications execution environment according to the invention which creates an application data flow from portions of the application selected for executing on the accelerated components.

Referring now to a best mode of implementation for the illustrated embodiment, details of the embodiment are presented herein. FIG. 2 depicts a block diagram detailing the functionality of the various elements shown and described within FIG. 1.

Referring now to FIG. 2, the application 100 is an object oriented application developed as described above, utilizing any of a variety of object oriented programming languages. Any computer language capable of being translated into a dataflow model can be utilized by the application environment 110, including object code, micro-code, machine code or any combination thereof.

The application 100 is received by the applications environment 110, and more specifically, by the application data flow 202, where timing and communications between objects are established. In the illustrated embodiment, the application data flow 202 contains objects A 52 through F 62, however it should be noted that each application will vary in the number of objects and specific dependencies between those objects. Further, a single application can contain multiple application data flows operating in serial or parallel fashion, or even recursively or any combination of the three.

Once an application data flow 202 has been established (or a real-time segment of an object data flow established), the applications environment 110 identifies objects (or functions) within the application data flow that contain functionality that can be supplied by components 104, 106, 108 (FIG. 1) in communication with the framework 102 (FIG. 1). In the illustrated embodiment, it can be seen that application objects B 54, C 56 and F 62 have been selected.

Application objects are identified as suitable for execution within the components through use of information which, in the illustrated embodiment, is stored in one or more client libraries 128. In some embodiments, each client library 128 contains administrative data including a functional characterization of each component in communication with the process (here components 104, 106 and 108 in FIG. 1), and at least one configuration characterization of each of those components pertaining to operational configurations possible for that component. The functional characterization and configuration characterization together are referred to as administrative information and are passed to the applications environment 10 via an interface 212.

The applications environment 110 uses the administrative information from the client library 128 to learn what I/O devices are supported, a high-level description of the processing resources available, and which files are available on any media storage devices local to the framework 102 (FIG. 1), or frameworks in communication with the applications environment 10. In some embodiments, the applications environment 10 reads files directly from a framework 102 to obtain component attributes, e.g. file media type, image size and other parameters that are required to be known.

When a match is found between functionality within an application object and functionality that can be preformed by one or more of the components, the matching application objects are replaced (or represented) by a proxy object and moved into an accelerated data flow 214. The proxy object is a place holder, hence, in other embodiments the use of proxy objects need not be used, but any method of representing a portion or portions of an application can be utilized. In the illustrated example, objects B 54, C 56 and F 62 have been identified as suitable for accelerated execution via the components, and therefore have been removed from the application data flow 202 and replaced by proxy objects B' 54', C' 56' and F' 62' in the accelerated data flow 214. Of course, other methods of representing those selected portions of the application can be used in other embodiments.

Communication between the application objects in the application data flow 202 and the those in the accelerated data flow 214 is established such that the proxies appear as application objects to other application objects and hence, appear as application objects to the application. Proxy objects in the accelerated data flow 214 discover each other and establish communication between themselves as appropriate, such as when proxy objects are logically adjacent, e.g. B' 54' and C' 56'. It can be appreciated at this point that as components are added, removed or modified, information within the client library can be updated thereby mitigating the need for modifications, recompiling and/or relinking the application 100.

The proxy objects are appended with administrative information returned from the client library 128. One method of performing this task is through use of API adapters appended to each proxy object, however, any method of associating the administrative data with the proxy object can be used for this purpose, e.g., by reference, stacking or other method.

Proxy objects within the accelerated data flow 214 are then grouped into job streams (e.g., 232, 234). Each job stream 232, 234 contains one or more proxy objects that can be executed as a group, that is, as a scheduled invocation of the proxies within the job stream. Once data is passed to the first proxy objects within the group (e.g., B' 54), all remaining proxy objects within that job stream can be executed without any intervention by the application.

When a job stream is invoked, the applications environment 110 communicates with the client library 128 which then passes both the administrative information via an interface 236 (or API adapter) and data via an interface 238 to the framework 102 which in turn, invokes the components 104, 106, 108 to perform functionality on that data in accordance with the administrative information.

Therefore, it will be appreciated by those skilled in the art that proxy objects as used herein represent components, e.g., 104, 106, 108 (FIG. 1). To the application 100, proxy objects appear identical to their native counterparts (e.g., B' 54' appears to the application as B 54). Further, proxy objects in the application environment 110 as shown in FIG. 2 represent scalable components implemented on hardware (or software, firmware or any combination thereof), e.g., components 104, 106 and 108 of FIG. 1. As such, the embodiment provides for plug-in compatible replacements for existing objects, and further, proxies can be implemented to provide new, functional extensions to existing application environments.

In view of the foregoing, and as will be further appreciated upon study of the text of this application that follows, a system according to the invention can be used to configure for task execution not only special purpose devices (e.g., of the type specifically identified in FIG. 1) but also general purpose or otherwise reconfigurable devices, ranging from field programmable gate arrays (FPGAs) to conventional processor chips (e.g., of the types available from Motorola, Intel and others) to high-end computing nodes (e.g., of the types available from the assignee hereof).

For example, in one embodiment, one or more FPGAs are coupled for communication (e.g., via a backplane, an interconnect, bus or otherwise) with the framework engine 102. The library 128, descriptor object 302 (described below) or other repository stores gate-level configurations for installation on the FPGAs. If a match is found between one or more application objects (and, preferably, a series of such objects defining an application data flow), suitable ones of these gate-level configurations are applied to the FPGAs, thereby, configuring them for pipelined processing of tasks corresponding to those application objects. In addition to configuring the FPGAs, the framework 102 manages these pipelines on the fly, e.g., making them suitable for processing in a high-throughput or streaming environment.

In the embodiment described above, the gate-level configurations can be viewed as components themselves (e.g., like FFT 104, reconstruction component 106 and SAR component 108)—albeit ones that are represented as gate-level configurations (or software). In this sense, they are deemed plug-and-play components (i.e., insofar as they are "plugged" into the FPGAs and "played" on them in order to provide the desired functionality).

In a related embodiment, the applications environment is embodied in (and executed on) a conventional processing platform, e.g., a PowerPC or Pentium processor, and so forth. One or more high-end computing nodes (e.g., of the type available from the assignee hereof) are coupled to the framework engine (again, for example, via a backplane, an interconnect, bus, or otherwise). The library 128, descriptor object 302, or other repository stores executable software modules in the native instruction set of the computing nodes, in intermediate code for execution via an execution engine embodied in the node, or otherwise. If a match is found between one or more application objects, suitable ones of those modules are downloaded to the computing nodes, thereby, configuring them to handle tasks defined by those application objects. As above, in addition to configuring the computing nodes, the framework 102 manages them on the fly.

An embodiment as described above can be deemed as providing a "mixed container" execution environment, since it results in execution of applications data flow on multiple platforms. It permits applications that would normally be executed on targeted hardware (e.g., a conventional personal computer or workstation) to attain benefits normally only associated with high-end platforms. More plainly put, portions of an application can be executed by the framework on high-end computing boards or nodes, without requiring acquisition of an entire high-end computing system.

In still another embodiment, FPGAs and/or general purpose processors (e.g., from the Pentium processor family or otherwise) are coupled for communication with the framework engine 102. The library 128, descriptor object 302, or other repository stores gate-level configurations for installation on the FPGAs and executable software modules for execution on the processors. The applications environment selects from among these resources (in view, of course, of the available gate level configurations and executable modules) to find one suitable ones for handling application objects. Such an embodiment permits an application to run across general purpose processors and/or FPGAs, while still leaving the applications programmer the option to scale into high-end computing nodes.

Figure 3:
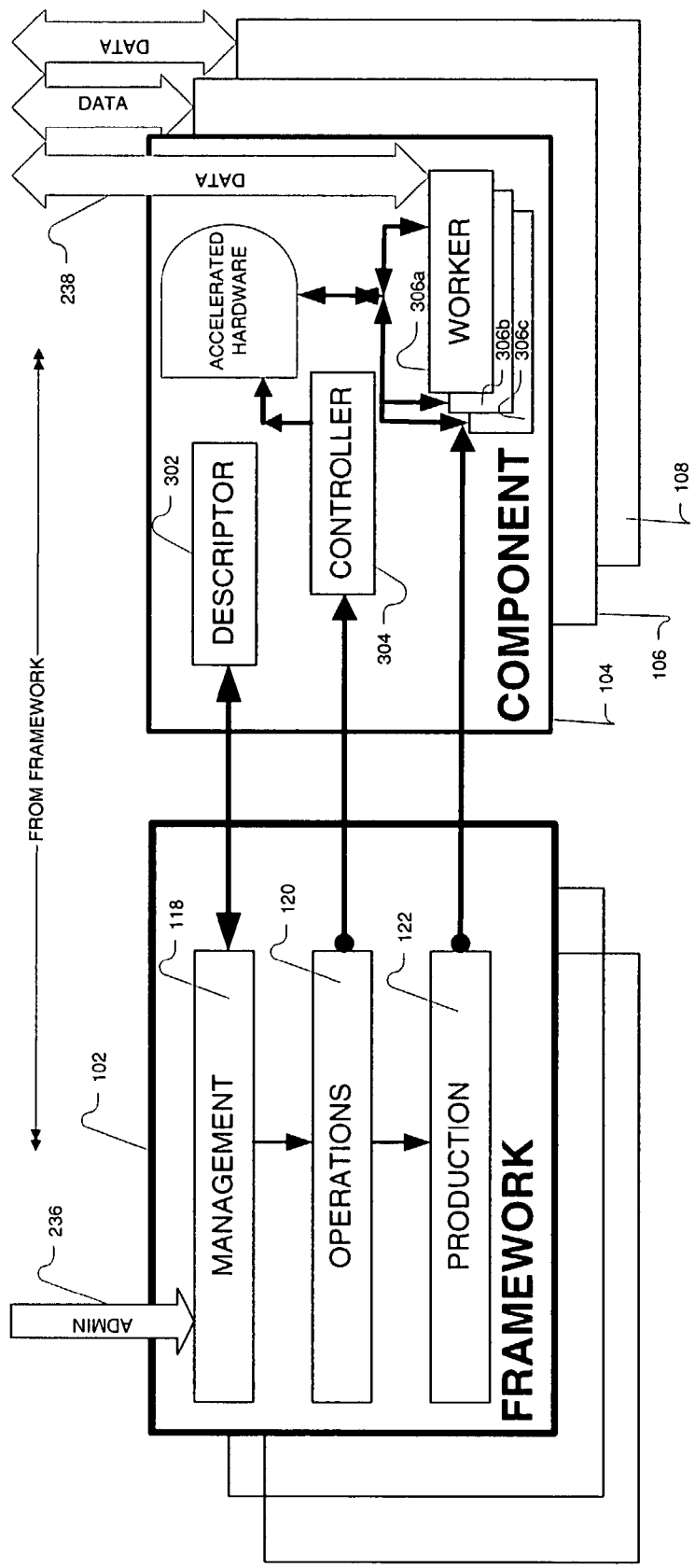
FIG. 3 depicts a framework according to the invention that allocates, configures and invokes components in response to administrative information and data from the applications environment.

Now referring to FIG. 3, the framework 102 is responsible for effecting performance of the functionality contained within the administrative information (via an interface 236) on the data (via an interface 238). It should be noted that multiple frameworks can be executing concurrently either locally or remotely to the client library 128 (FIG. 2).

The framework 102 as illustrated is a multi-layered architecture similar to a stacked protocol, however in other embodiments the framework 102 can otherwise merge or separate the layers illustrated. Further, the layers can be implemented in software, hardware or firmware or any combination thereof. Further, the framework 102 can be implemented as subsystems, each representing different functionality and each furthering the performance of the functionality identified in the administrative information to the data.

In overview of the various layers shown in the illustrated embodiment, the management layer 118 is responsible for administration and initial runtime access of the components, here 104, 106, 108. Each component is selected by the management layer 118 according to the functionality characterization within the administrative information. As such, the management layer selects one or more of the components which can perform the identified functionality on the data in accordance with the configuration characterization. Further, the management layer allocates each of those selected components, and passes to the operations layer 120 the selection of allocated components and a configuration for each. It is of note that, after initialization, runtime access bypasses the management layer.

The operations layer 120 dispatches and controls each runtime instance of each component, here 104, 106, 108. The operations layer 120 applies the configuration received from the management layer 118 to the corresponding component. Further, the operations layer 120 communicates to the production layer 122 the input and output configuration of the component as configured by the operations layer. Generally, the configuration contains input and output "pin" assignments similar to a hardware pin configuration, but other representations of the components are envisioned, such as input stacks, queues, matrices, or other references depending on the implementation of the components.

The production layer 122 receives the input and output pin configuration from the operations layer 120, and both synchronizes and moves the data to, from and among the configured components. The production layer 122 therefore controls inner-looping found in traditional accelerated applications and all data movement.

The management layer 118 accesses a descriptor object 302 that contains a functionality description detailing the functionality that the component 104 can perform. Further, the descriptor object 302 contains at least one configuration that can be applied to the component, e.g., available input pins, available output pins, synchronization information, throughput, and like information describing the component. Each component in communication with a framework has at least one descriptor object.

The descriptor object 302 can be an Extensible Markup Language (hereinafter "XML") text file as described here, or any other readable store in communication with the framework 102. As will be appreciated by those skilled in the art, XML files are a series of file directives with the following format:

<xml_tag>args.

Each descriptor object 302 in the illustrated embodiment consists of three sections, but other implementation organizations are possible in differing embodiments. The first section is a packaging section which specifies the details of the component's part list, including the filename of the controller's binary file (if in file format), its file type and version information. Second, a connections section specifies a list of connections available between worker objects, and is used to instantiate worker objects with compatible synchronization and movement capabilities. Finally, a configuration section of the file defines acceptable configurations for the component. As will be appreciated by those skilled in the art, the tags in some embodiments, can be similar to those defined by the Object Management Group ("OMG") in the Common Object Request Broker Architecture ("CORBA"), though other embodiments may use other tags defined by industry standard or otherwise.

In general, a component author defines multiple configurations for different performance goals such as optimizing for latency or optimizing for throughput. Different configurations can define different levels of optimization as well. Thus, runtime scaling can be achieved by selecting the best-fit configuration for the client's requirements (as indicated within the administrative information appended to the proxy object) when the component is instantiated.

Thus, the management layer 118 uses the information within the descriptor objects 302 to select and allocate one or more component configurations based on the administrative information 236 received from the client library 128 (FIG. 2).

The management layer 118 passes the selection of allocated components to the operations layer 120, including information as to how the components are to be used. The operations layer 120 makes no location or scaling decisions on its own, but sets up resources based on instructions from the management layer 118 for sufficient configuration of a component.

To this end, the operations layer 120 instantiates a controller object 304 for each instance of a component. A controller object 304 may be a generic controller suitable for a variety of operations (complex or otherwise) of the component, or may be tailored for specific for certain operations. Each instantiated controller object 304 represents a single usage of the component's function within a job stream, e.g., 232, 234 (FIG. 2). Thus, if a job stream needs to perform a FFT at two different points during execution, the controller object for a FFT is instantiated twice. It will be appreciated by those skilled in the art that a one-to-one relationship between controller objects and object proxies is maintained, however, it is anticipated that this relationship can be changed in other embodiments.

The production layer 122 provides data flow and synchronization through instantiating one or more worker objects, e.g., 306*a*, 306*b*, 306*c*. The production layer 122 and worker objects 306*a*, 306*b*, 306*c* provide only for data channeling to, from, and within the components. Each component (here, 104, 106, 108) is thereby represented by one or more worker objects (e.g., 306*a*, 306*b*, 306*c*0. Each worker object is an independently running code module that contributes to the computation and data streaming of an instantiated component. The production layer 122 in the illustrated embodiment is memory constrained and thereby completes few if any setup and control operations, however in other embodiments the functionality of the operations layer 120 and the production layer 122 can be combined or further separated or otherwise divided.

Thereby, it will be appreciated by those skilled in the art that a worker object 306*a*, 306*b*, 306*c* is analogous to the process inner loop found in traditional accelerated applications well known in the art, and shares with it the lean, low-latency characteristics required of critical code sequences. This maximizes the efficiency of data movement thus avoiding unnecessary computing overhead.

Even further, worker objects 306*a*, 306*b*, 306*c* perform no Remote Procedure Call ("RPC") type communication with other workers or controller objects 304. Multiple worker objects 306*a*, 306*b*, 306*c* can be implemented as a processor thread and be cooperatively context-switched by controller objects 304 changing values in shared data structures thereby completing time-critical transformations required to make the component a viable player in the target application environment. As such, worker objects 306*a*, 306*b*, 306*c* activities are highly focused on the job stream at hand and therefore are narrowly focused for speed and efficiency.

It can be appreciated to one skilled in the art that within the framework 102, management of reusable collections and configurations of objects can differ from environment to environment. The illustrated embodiment follows the common practice of most application environments by leaving the responsibility of managing, cataloging, and reusing such configuration to the application, however it is will within the scope of different embodiments to manage such functions within the framework 102.

Data management is accomplished via a data reorganization initiative (hereinafter "DRI") dealing with data modeling and distribution of data over a large array of processes for distributed computing. Its key concepts relate to separating global from local data, handling the algorithmic requirements for data availability and defining the partitioning and movement of data. The two areas where DRI impacts the design of the framework 102 is the component and local (e.g., port level) data description and the methods available to the worker to query information regarding local data.

Figure 4:
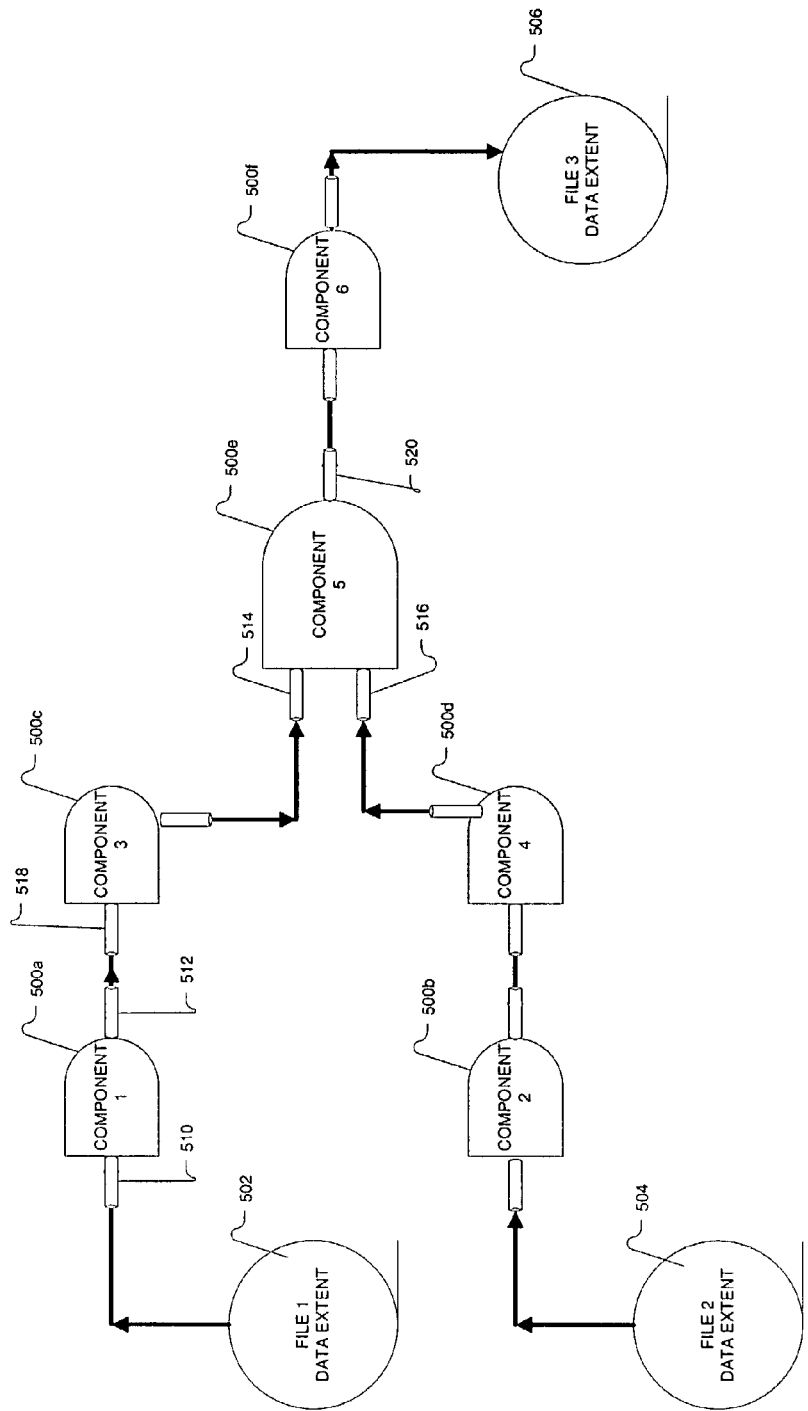
FIG. 4 depicts a generalized data flow between components illustrating the use of input and output pins, and the data flow between output pins and input pins of subsequent components.
Figure 5:
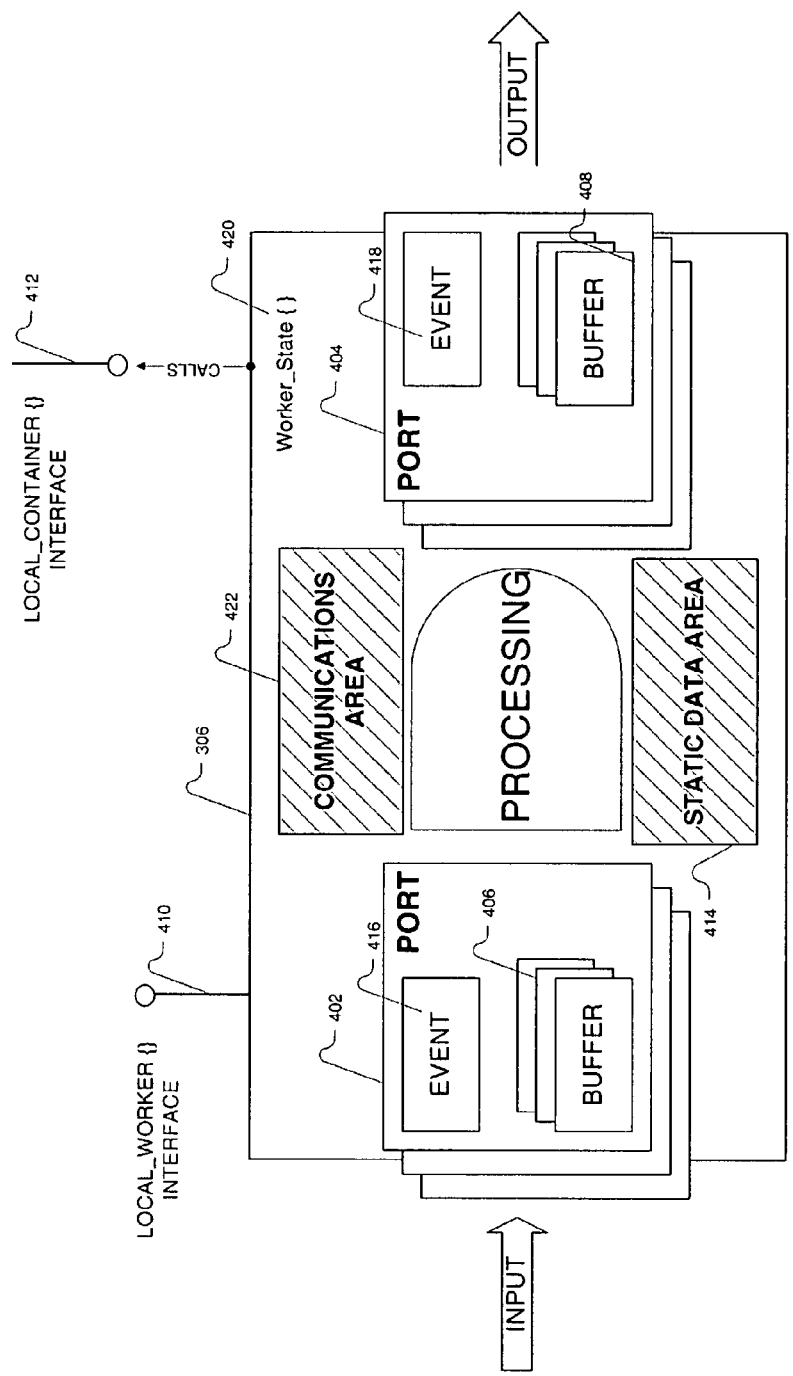
FIG. 5 depicts a worker object as a functional block diagram to illustrate external ports and interfaces.

There is no concept of global data within the illustrated embodiment, however, it is possible to modify the data management scheme within other embodiments and still achieve the overall aspects and objectives. Typically, there can be multiple sources of data processed, each one having its own data extent as illustrated in FIG. 4 depicting the data flow within components. Data extents can be stored as input files, e.g., 502, 504 and output as files, e.g. 506.

The illustrated embodiment models functions and processes in the form of components 500*a*-500*f*. These components have the ability to handle data at their external connections, referred to as "pins," e.g., 510, 512, and are defined in the corresponding descriptor object 302 (FIG. 3).

Each component 500*a*-500*f* represents a specific function to be performed on a set of data, contained within an input data extent. The component interfaces with the external world through a set of "pins" analogous to the pins of a hardware device. Input pins, e.g. 510, 514 and 516, accept data from either a data file 502, 504 (e.g., virtual file, high speed cache, disk, or otherwise in communication with the component), or from the output of a component, 518, 514 and 516. Output pins, 512, 520, allow data to be sent from a component to the input of another component, 518, or to a data file, 506.

Further, parallel processing within one or more components can be accomplished through multiple data streams through the components. For example, in the illustrated embodiment, a file extent 502 can be processed by components 500a and 500c concurrently with the processing of file extent 504 through components 500b and 500d. At the appropriate time, according to data synchronization contained within the configuration (e.g., from the descriptor object 302), the resultant data streams can both be input into a single component, e.g. component 500e, through multiple input pins 514, 516. Through this process, parallel processing can be accomplished and execution further accelerated. The data can, alternatively, include data extents embedded within the data stream. These data extents are compared with the ability of the component pin's data handling capability before the data is allowed to stream from that source.

When the output pin of a first component, e.g. 512 is connected to the input pin of the second component, e.g. 518, the data produced under the output pin's data constraints is able to satisfy the input pin's data constraints. The metadata associated between the input and output pins of a connection and tile run time data extents associated with the data stream have all the information necessary to create the correct movement of data. This is unaffected by the scalability inherent in the framework due because the worker objects can be attached to both the pins and vary in their configuration.

Therefore, the DRI concepts are used to model data movement through a pin, and the synchronization and movement of data is preformed via worker objects 306 (FIG. 3). In detail, referring now to FIG. 6, which depicts a generic implementation of a component with worker objects 306. As previously noted herein, worker objects 306 receive, transform, and transmit data 238 (FIG. 2) received from the applications environment 214 (FIG. 2). The implementation of worker objects 306 is typically performed by the component author and delivered with the component. Because the production layer 122 (FIG. 3) is performance and memory constrained (to be lean and narrowly focused for efficiency), worker objects 306 complete few, if indeed any, control operations for themselves.

A worker object's 306 runtime environment consists of three primary pieces: First, a framework 102 furnishes a worker_state data structure 420 to the worker object 306. The worker_state structure 420 provides to worker objects 306 various resources (e.g. ports 402, 404) which provide the object's external data sources, data sinks and events 416, 418; static data areas 414 where data across multiple invocations of a worker object can be stored; and a communication area 422 with a buffer for implementing a component-defined message protocol between a worker and its controller object 304 (FIG. 3).

Second, the worker object 306 implements a local_worker interface 410 and makes it available to the framework 102. The interface 410 provides the framework with methods for controlling the worker 306.

The framework 102 furnishes a local_container interface 412 to the worker object. This interface provides the worker with methods for data synchronization, event posting, and other external handshaking.

As illustrated, ports 402, 404 provide for all of a worker object's external input and output data. Allocation, connectivity, and attributes of a worker's ports is completed by the framework 102 based on directives specified in the component's descriptor file 302 (FIG. 3). While a worker is unaware of a port's connectivity or the particulars of any resource allocated for the port, the port's attributes are passed to the worker and include, for example: the number of storage buffers (if any), any associated events, and data striping if necessary. Striping refers to any attributes related to the reorganization of data as it is distributed across multiple workers. In general, a port will have at least one buffer, one event, or both.

Because multiple workers created from the same controller object 304 might occupy the same executable image, static variables can't guarantee the preservation of data variables across invocations of a worker. For this reason, the worker_state structure 420 defines a static data storage area 414 for data that must be preserved across invocations of the worker. The size of this area is specified by the component's descriptor object 302.

The communication area 422 provides a buffer that can be used to implement a component-defined messaging protocol between the worker and a custom controller object. Non-generic properties can be stored within the communication area 422, and passed in a generic way. If the component uses the default controller, this data structure is not used.

The local_worker interface 410 must be implemented by the worker, and provides a control interface to the worker's client, i.e. the controller object 304. Workers generally break down into two major subdivisions: setup code and inner loop code. Setup code, implemented by the interface's init( ) method, generally runs once and executes functions with high levels of latency and low levels of determinism, such as allocating and mapping local memory.

In contrast, inner-loop code, implemented in the interface's run( ) method, executes low-latency functions providing high levels of throughput and determinism. Functions appropriate for inner-loop processing include optimized library functions such as those provided by Mercury's Scientific Algorithm Library and C/C++ language primitives.

In general, the run( ) method applies the three classical computer activities to data: input, process, and output, and is invoked each time the worker's defined run condition evaluates to true. Data input and output, including synchronization, is handled entirely by port objects, which require little of she worker beyond some simple data-ready interrogations and notifications accomplished through the local_container interface 412 presented to each worker at startup.

A third method, cleanup( ), gives the worker the opportunity to release any independently allocated resources such as local buffers. A worker's cleanup( ) method is invoked if and when the worker is destroyed.

The local_container interface 412 is the worker's portal to the outside world, and presents a short list of methods to workers for controlling access to buffers and for monitoring and posting events.

In the illustrated embodiment, a "producer, consumer" method is used to determine when data is ready to be passed or when a worker is ready to receive data. One skilled in the art can appreaceate that this is but one of many methods to accomplish synchronization, and in other embodiments different methods can be utilized.

Before processing data from an input port 402, the worker must determine that the data is ready. Similarly, after outputting data from an output port 404, the worker must notify upstream consumers that the data is ready. Two methods defined by the local_container interface 412 simplify these requirements: produce( ) and consume( ).

The produce( ) method is invoked by a worker to indicate a full output buffer or to post an event. The consume( ) method is invoked by a worker to announce an empty input buffer or to wait on an event. In a simple, monolithic processing loop with a single input and output data port, the following pseudo code illustrates access synchronization using produce( ) and consume( ).

<loop>
consume( )
<Read data from input port>
. . .
. . .
. . .
produce( )
<Write data to output port>
<endloop>

When a component is instantiated, the core creates a default controller object if no controller is provided by the component. Many components have no need for a custom controller, and can meet their processing requirements with a default controller. Others, however, require more sophisticated control than a default controller can provide.

For example, data-flow applications, in which the same, pre-ordained operations are applied to repetitive injections of new data, are served well by default controllers. In such applications, input values do not dictate what processing the applications should do, unlike a typical control flow application that, for example, decides what processing to do based on the input values generated by keystrokes.

If, however, a component finds itself serving a control-flow application and must determine some portion of its processing based on input values, a custom controller can be necessary. Unlike the default controllers, custom controllers can establish real-time feedback loops with their workers through the communications area passed to the worker as part of its worker_state data stricture 420. Through this communication area, a messaging protocol can be implemented between the controller and a given worker, allowing workers to notify the controller of the receipt of any input values which might prompt the controller to initiate a change of processing.

The port abstraction captures the data management at the worker level. Associated with each port are buffers 406, 408 that actually hold the data. Depending on the type of buffering chosen there maybe one or more "temporal" buffers attached to a port.

The local data model at the worker level is intimately related to the buffers associated with the worker and the number of workers involved in the local data distribution. The framework 102 uses the component data descriptor object 302 to populate the pin related attributes (e,g., properties) for that instance of the component. These properties are also visible for reading by the worker. The pins of the component are connected with the ports of the worker. Each port has associated with it one or multiple buffers depending upon the descriptor specifications.

Once the infrastructure decides on the number of workers for the component, it has all the information necessary to create the partitioning specification for the buffers associated with the workers. The partitioning information is made available to the worker through the data structures described below.

The worker_state interface has two structures that contain the partitioning information for the worker. The group structure informs the worker as to the number of workers in its worker set; and it also tells it its rank within the set.

The port_state structure contains the partitioning and the data stream related information for each port associated with the worker.

These structures are presented here more as a guideline for the design of the framework. The exact implementation may vary with each implementation.

The block structure below defines the block of data that is located in the local memory buffer on a per dimension basis.

```
typedef struct {
    int   left_ov; //specifies the number of left overlap in this dimension
    int   right_ov    //specifies the number of right overlap positions
    int   begin_ix;   //global index of the first "owned" data element in
                      the block in this dimension length (integer) -
                      number of "owned" data elements in this dimension
    int   length; //number of "owned" data elements in this
                  dimension owned by the port
    int   stride; //number of elements between consecutive data elements
                  in the local data buffer in this dimension. If this value is
                  1, then the data is densely packed, with no spacing
                  between consecutive elements
} Block
```

The extent of the data associated with a particular stream is defined by the stream data extent structure that is passed along with the data in each data stream. This structure is available to each worker for its consumption.

```
Typedef{
    Int ndims;            //number of dimensions
    Int dimsizes[ndims];      //size of each dimension of the stream's
                              global data
    Int element_size          //data type of each element in the stream
} stream_global_data
```

The stream global data structure needs to be known even before a job is started as it impacts the optimal sizing of buffers of all the downstream components. It is suggested that there can be a small temporary job run specifically to gather all the stream related data statistics so that the buffers can be sized accordingly. This means that whenever the stream is changed by the application, the current job should be terminated and a new one started if the stream structure changes. In the case of reading files from a disk this could happen as frequently as the file name is changed.

The port_shape structure below combines the stream global data structure that is populated by the metadata originating at the stream origin with that associated as a result of partitioning based on partitioning specs.

```
typedef struct {
    stream_global_data sgd;        //global extents
    int first_offset; //offset (in elements) from the beginning of the local application's
                      memory buffer to the first owned" element of this data block. It therefore in
```

-continued

```
    some cases does not identify the first data element in the block, since the
    first element in storage could be the result of an overlapped data partition-
    ing.
    int num_blocks[dims];       //number of blocks per dim.
    Blocks blocks[ndims]; //detailed information (on a per-dimension basis) about the
        range of global indices covered by the local lock of data referred to
        by this blocks structure
} Port_shape;
```

The Port_shape is then used to define the shape of data that resides in the buffer associated with it.

```
typedef struct {
    unsigned long ordinal;      //ordinal for the current buffer
    void *current_buffer;       //pointer to the current input/output
                                buffer
    unsigned int buffer_size;   //size of the buffer
    Port_shape data_shape;      //shape of the data in the buffer
    unsigned long event_count;  //count of outstanding events at
                                a port
} Port_state;
```

The group structure described below provides the worker with information regarding the size of its worker set, and the position that it occupies within the set.

```
typedef struct {
    unsigned int nworkers;      //number of workers in the group
    unsigned int myrank;        //rank of the worker
} Group;
```

Group info and extended port structure discussed above provide the worker with all the information that it needs to process data correctly. These structures are generated at run time based on the metadata describing the pin and decisions made by the component writer regarding number of workers connected to that pin.

```
typedef struct {
    Version version;            //local copy of the interface version
                                number
    Local_container *lci;       //pointer to the local container
                                interface
    void *static_area;          //pointer to the worker's static data area
    void *comm_area;            //pointer to the worker's
                                communications area
    Group group;        //Worker's group structure
    Port_state port_states[1];  //a variable length array of port
                                state structures
} Worker_state
```

Figure 6:
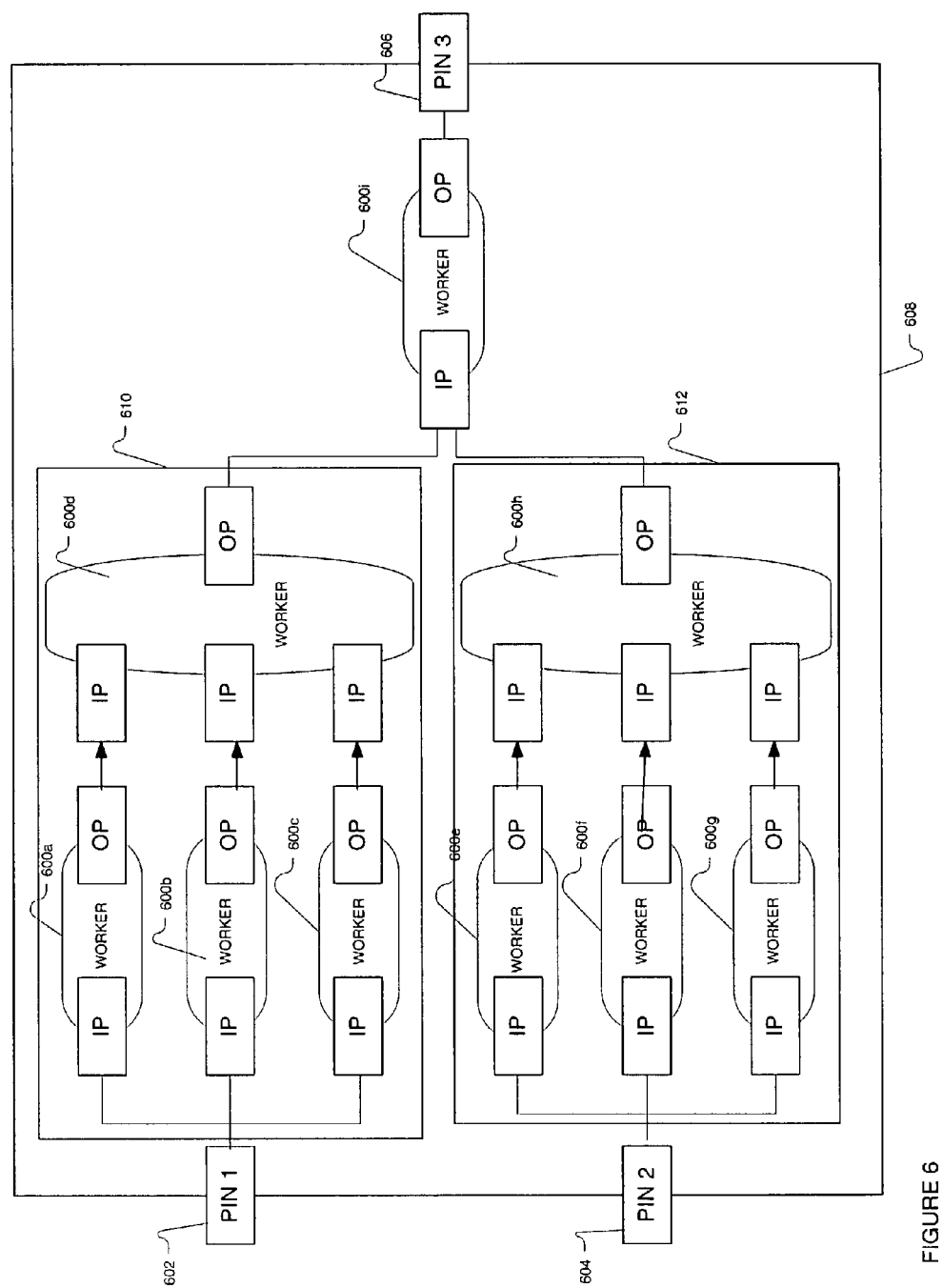
FIG. 6 depicts the internal structure of a component including the data flow between worker objects and, ultimately, between the component input and output pins.

Now that an understanding of worker objects 306 as been acquired, FIG. 6 illustrates a typical example of the relationship between data synchronization and movement performed by the worker objects (within a component) into, among, and out from a set of components performing functions.

As can now be appreciated by one skilled in the art, worker objects have the equivalence of a process in the data language. Worker objects can be arranged to provide both serial and parallel processing, much like a data flow process. An example of a typical data stream 608 is depicted within FIG. 6. In the example, there are two input pins, pin 1 (602) and pin 2 (604). Data from each of these two pins is input into a corresponding worker group, e.g., 610, 612. The output of each worker group 610, 612 is input into a final worker 600*i*, and output through pin 3 (606). Of course, every data flow will vary according to each specific application.

From tile figure, it can be appreciated that a worker group 610 can operate in parallel with other worker groups, e.g., 612. Worker group 610 and worker group 612 both then supply inputs to the final worker 600*i* in the illustrated example sequence 608. Moreover, within a worker group, individual worker objects can also operate in parallel; for example, workers 600*a*-600*c* perform different functions on the same input data from pin 1 602. The resultant data is input into worker 600*c* for a functional transformation before being input into worker 600*i*. The output pin 606 can be routed back to a proxy object or another data flow stream, as appropriate for the job stream. As shown, therefore, worker objects can be combined within a data flow to provide various data movement into, among and from components. Each job stream will have a one or more data flows that are created for that job stream.

As such, component level data constraints are defined for each pin associated with it. This information is provided from the component descriptor object and is maintained in the infrastructure for its consumption in the client library. Any data partitioning information is provided in the form of partitioning specifications, also contained within the descriptor object. Pin constraints are associated with a particular pin. Named partition specifications can also be associated with an internal pin, e.g. the input pin to worker 600*a*, to assist the component writer in managing data internal to a group of workers. Thus, the component level data description in the illustrated embodiment can be as follows:

<partition_specs> Describe the partition specifications for the data abstractions that are associated with it. The following tags are all related to this tag.

<array ndims_supported> An array specifying the number of dimensions supported by the pin <max_dim_sizes ndims maximum_size>maximum size of each dimension supported by the pin.

<array element_sizes_supported> An array of sizes of each element supported by the pin in # of bytes.

<SCE_layout layout> Can have one of the following values: DRI_LAYOUT_PACKED_012

DRI_LAYOUT_PACKED_021
DRI_LAYOUT_PACKED_102
DRI_LAYOUT_PACKED_120
DRI_LAYOUT_PACKED_201
DRI_LAYOUT_PACKED_210
DRI_LAYOUT_PACKED_01
DRI_LAYOUT_PACKED_10

These pre-defined layout objects specify the order in which a multidimensional local buffer is organized in linear memory space. The numeric codes at the end of each predefined symbol serve this purpose. The most contiguously arranged dimension is indicated by the LAST digit of the predefined object name. The least contiguously arranged dimension is the FIRST digit shown in the object name. The term PACKED refers to data that is compactly stored in memory, meaning that the user is requesting no strides between consecutive elements of the local data.

710 of the component represented. For example, component 1 702 represented a component capable of performing FFT's, however, it can be appreciated that any type of component can be represented by an entry, and that each component has a corresponding entry in the client library. Further, any number of entries can be stored within the client library 128.

```
<is_aliasable flag>          If 1 (TRUE), it means that ports/buffers associated with it support the
aliasing i.e. connection to another component aliases the buffers with this pin to the buffers
on the other pin.
<part_spec ndims distribution_type>    distribution type:
                                       DIST_INDIVISIBLE DIST_BLOCK DIST_BLOCKCY-
                                       CLIC
<part_spec ndims number_worker>        minimum number of workers dividing data in that
                                       dimension. Ignored for DIST_INDIVISIBLE.
<part_spec ndims minimum_size>         minimum number of elements required, 0 for no
                                       prefer.
<part_spec ndims modulo>               modulo specifies number of local elements ultimately
assigned must be a multiple of modulo. Ignored for !=DIST_BLOCK.
<part_spec ndims blocksize>            block cyclic partitioning block size that gets assigned to a
worker. 1 implies Cyclic.
<part_spec ndims left_overlap_type> overlap policy at global data edges OVERLAP_
                    TRUNCATE OVERLAP_TOROIDAL OVERLAP_PAD_
                    ZEROS OVERLAP_PAD_REPLICATED
<part_spec ndims left_num_position>number of positions to overlap
<part_spec ndims right_overlap_type>overlap policy at global data edges OVERLAP_
                    TRUNCATE OVERLAP_TOROIDAL OVERLAP_PAD_
                    ZEROS OVERLAP_PAD_REPLICATED
<part_spec ndims right_num_position>number of positions to overlap
<pin_constraints pin_number partition_spec>Describe the constraints applicable to the data
                                that passes through it.
```

The primary purpose of the pin constraints is to determine the validity of connecting two components and to ascertain the correct block of data to move between the ports of the workers.

Thus, now the applications environment 110 (FIG. 1) and the framework 102 have been described, as well as the infrastructure of each. Now, then, the client library 128 which is a store of information as well as an interface between the applications environment and framework is described.

Figure 7:
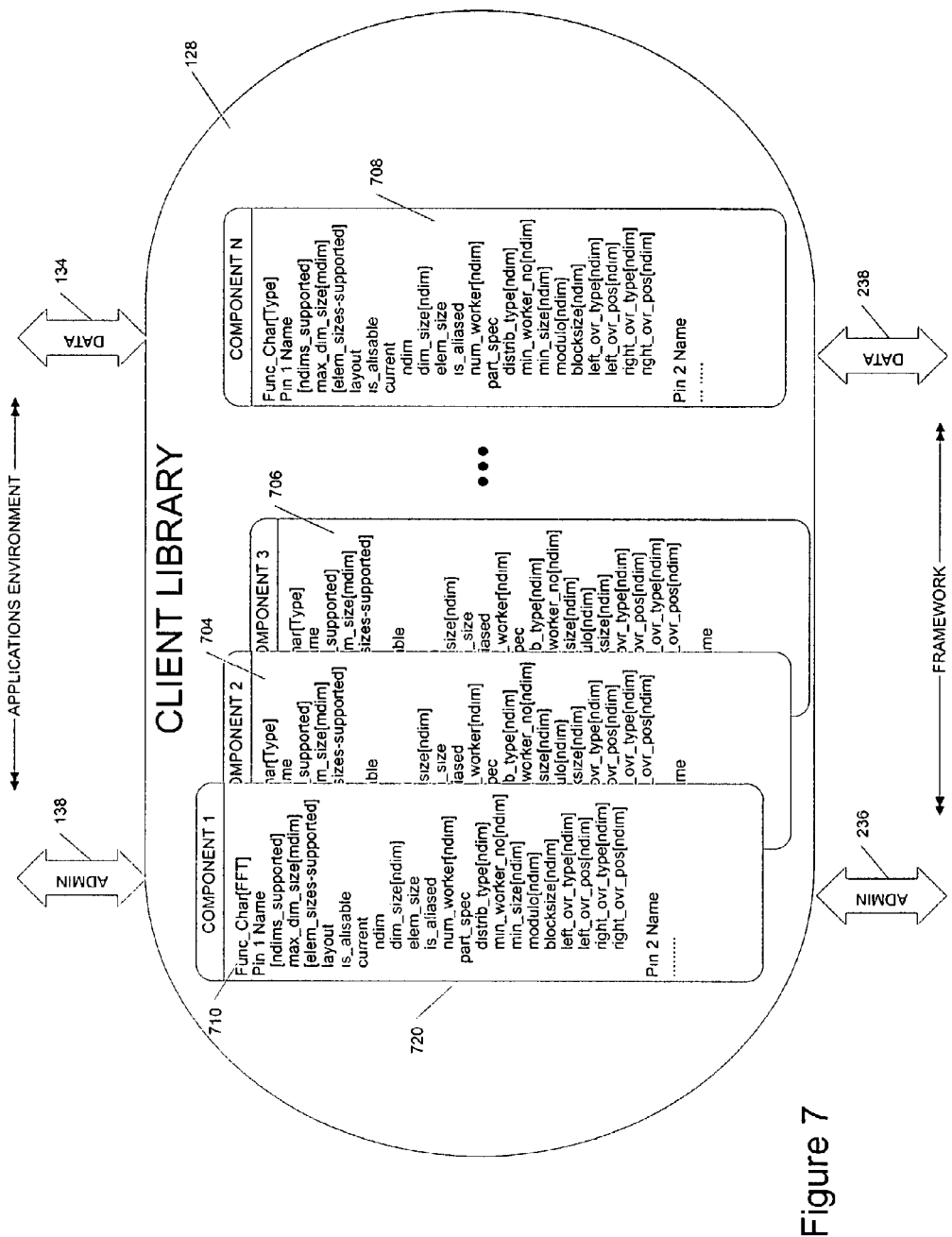
FIG. 7 depicts the client library containing functional and configuration characterizations for each of the components in communication with the applications environment.

Referring now to FIG. 7 the client library 128, stores functional and configuration characterizations, referred to in the collective as administrative information. The client library has an entry 702-708 for each component in communication with the applications environment. Thus, it can be accessed to determine the available functionality and configuration parameters for the one or more components in communication with the applications environment. The entries 702-708 can be populated first by accessing the descriptor objects contained within each framework in communication with the library, and further, the entries can be updated using real-time current configuration information for instantiated components.

Each component in communication with the applications environment is discovered by the library by accessing the one or more frameworks. The frameworks pass information contained within the descriptor objects, each representing a component in communication with that framework. Once this is initially accomplished, is it stored in the library and modified only upon adding, removing or otherwise modifying the components.

Because the applications environment compares the functionality of application objects with that of the components as a prerequisite to selecting objects for execution on the components, The entry contains a functional characteristic The configuration characteristic contains information relating to the input and output pins of the component, and for each, the available size and number of dimensions each can operate upon. The configuration characterization is used to determine whether data constraints of the represented component. Data within the application object (or other portion of the application) is analyzed to determine such attributes such as number of dimensions and element size (as appropriate for the function of the object). Of course, other functions have different configuration constraints depending on the input and output of the function, for example, some functions may be single-dimensional by definition, or be capable of performing a function on any data set size.

Entries within the client library 128 are updated as the corresponding component is instantiated, thus indicating the current configuration that is currently installed in the component. As such, it will be appreciated by those skilled in the art that components can be selected by the client library that not only match functionality, but also are currently in a configuration able to accept and produce data with the same constraints as required by the current application. This capability mitigates the need to re-configure the component, thus increasing the efficiency and throughput of the framework.

After the applications environment determines that an application object (or other portion of the application) is suitable for execution on the components, the corresponding component identification number (or other identify) and data constraints are appended or otherwise associated with the application object, and thereafter, with the corresponding proxy object (or other representation). One of several methods for accomplishing this task is through use of API adapters, although other methods are known.

Described herein are systems and methods achieving the achieving the objects set forth above, among others. A further appreciation of the illustrated embodiment and other embodiments may be attained by reference to the U.S. provisional application Ser. No. 60/275,204 filed Mar. 12, 2001, the teachings of which are incorporated herein by reference, and a copy of which is attached as an appendix hereto. It will be appreciated that the illustrated embodiments are merely examples of the invention and that other embodiments, incorporating changes to those described herein, fall within the scope and spirit of the invention.

We claim:

1. In a digital data processing system having a plurality of execution resources, including a central processing unit (CPU) and one or more further execution resources, the improvement comprising
   a process executing on the central processing unit,
   a store providing one or more descriptors each identifying a functionality of a configuration of a respective one of said further execution resources,
   the process dynamically selecting one or more portions of an application and effecting their execution on one or more of the further execution resources,
   a framework in communication with the process and the store,
   wherein the process generates at least one proxy for performing a function defined in at least one of said application portions and transmits said proxy and an identifier indicative of the function associated with that proxy to the framework, and
   wherein said framework assigns said proxy to one of said further execution resources based on a correspondence of the proxy identifier and a descriptor of said one further execution resource.

2. In a digital data processing system according to claim 1, the further improvement wherein the execution resources include any of co-processors, accelerators, controllers.

3. In a digital data processing system according to claim 2, the further improvement wherein the further execution resources include any fast Fourier transform devices, image reconstruction and synthetic aperture radar algorithms.

4. In a digital data processing system according to claim 2, wherein the further execution resources are disposed locally and/or remotely with respect to the CPU.

5. In a digital data processing system according to claim 1, the further improvement wherein the process causes the one or more further execution resources to perform functions that would otherwise be performed by the CPU executing the corresponding selected portions of the application.

6. In a digital data processing system of claim 1, the further improvement wherein the store identifies, for each execution resource, its type, its interface and its configuration.

7. In the digital data processing system of claim 1, the further improvement wherein the process selects the one or more sections of the application at substantially the same time that those sections are executed on the further execution resources.

8. In a digital data processing system having a plurality of execution resources, including a central processing unit (CPU) and one or more further execution resources,
   the improvement comprising
   a framework, in communications coupling with the CPU and with the one or more further execution resources,
   a first store comprising a functional characterization and at least one configuration characterization of each of the further execution resources,
   a process executing on the central processing unit, the process (i) invoking a proxy in place of each of one or more portions of an application, and (ii) executing remaining portions of the application on the CPU,
   the process dynamically selecting for invocation the proxy in place of one or more portions of the application comprising functions that match the functional characterizations contained within the first store,
   the framework responding to the invoked proxies to perform functions on the further execution resources in lieu of those which would otherwise be performed by the CPU executing corresponding portions of the application in place of which those proxies were invoked.

9. In the digital data processing system of claim 8, the further improvement wherein the process generates each proxy with an identifier of the functional characterization of the one or more respective portions of the application in place of which it is invoked.

10. In the digital data processing system of claim 9, the further improvement wherein the process generates each proxy with an identifier of a configuration of a further execution resource to be used to perform functions that would be performed by the CPU executing the corresponding one or more portions of the application in place of which the proxy is invoked.

11. In the digital data processing system of claim 10, the further improvement comprising
    one or more further stores, each associated with one or more further execution resources, each further store comprising a functional description and at least one configuration description of the associated further execution resources,
    the framework selecting for allocation one or more further resources based on a match between the functional description and configuration description in the associated further store and the functional characterization and configuration characterization identified in the proxy.

12. In the digital data processing system of claim 11, the further improvement wherein the framework configures the allocated further execution resources in accordance with the configuration description.

13. In the digital data processing system of claim 12, the further improvement wherein the process generates each proxy with data based on that which would be processed by the one or more respective portions of the application in place of which the proxy is invoked.

14. In the digital data processing system of claim 13, the further improvement wherein the framework applies the data from the proxy to one or more further execution resources in connection with invoking those resources to perform functions which would otherwise be performed by the CPU executing the corresponding one or more portions of the application.

15. In the digital data processing system of claim 14, the further improvement wherein the framework applies data generated by a further execution resource to one or more further such execution resources.

16. In the digital data processing system of claim 13, the further improvement wherein the framework stores to a proxy data generated by a further execution resource which performed functions that would be performed by the CPU executing the one or more portions of the application in place of which that or another proxy was invoked.

17. In the digital data processing system of claim 16, the further improvement wherein the process utilizes data contained in the proxy in connection with executing the remaining portions of the application on the CPU.

18. In a digital data processing system having a plurality of execution resources, including a central processing unit (CPU) and one or more further execution resources, the improvement comprising
    a framework, in communications coupling with the process and with the one or more further execution resources,
    a first store comprising a functional characterization and at least one configuration characterization of each of the further execution resources,
    a process executing on the central processing unit, the process (i) invoking a collection of proxy objects in place of a plurality of portions of an application, and (ii) executing remaining portions of the application on the CPU, where each proxy object corresponds to a respective portion of the application,
    the process dynamically selecting for invocation the collection of proxy objects in place of the plurality of portions of the application comprising functions that match the functional characterizations contained within the first store,
    the framework responding to invocation of the invoked collection to perform functions on the further execution resources in lieu of those which would otherwise be performed by the CPU executing corresponding portions of the application corresponding to the proxy objects in the collection in place of which those collections were invoked.

19. In the digital data processing system of claim 18, the further improvement wherein the process invokes the proxy objects within a collection substantially simultaneously as a job stream.

20. In the digital data processing system of claim 18, the further improvement wherein the process identifies adjacent proxy objects within a collection and establishes communications between those adjacent proxy objects in the collection.

21. In a method of operating a digital data processing system of the type having a plurality of execution resources, including a central processing unit (CPU) and one or more further execution resources, the improvement comprising
    a process executing on the central processing unit, invoking one or more proxies in place of each of one or more portions of an application, dynamically selecting for invocation of the one or more proxies in place of one or more portions of the application comprising functions that match the functional characterizations contained within a first store that comprises a functional characterization and at least one configuration characterization of each of the further execution resources,
    responding to the one or more invoke proxies to perform functions on the further execution resources in lieu of those which would otherwise be performed by the CPU executing corresponding portions of the application in place of which the one or more proxies were invoked, and
    executing remaining portions of the application on the CPU and utilizing in connection therewith data generated in connection with performance of functions on the further execution resources.

22. In the method of claim 21, the further improvement comprising generating each proxy with an identifier of the functional characterization of the one or more respective portions of the application in place of which it is invoked.

23. In the method of claim 22, the further improvement comprising generating each proxy with an identifier of a configuration of a further execution resource to be used to perform functions that would be performed by the CPU executing the corresponding one or more portions of the application in place of which the proxy is invoked.

24. In the method of claim 23, the further improvement comprising
    selecting for allocation one or more further resources based on a match between the functional description and configuration description in an associated further store and the functional characterization and configuration characterization identified in the proxy.

25. In the method of claim 24, the further improvement comprising configuring an allocated further execution resources in accordance with a configuration description maintained in the associated further store.

26. In the method of claim 25, the further improvement comprising generating with each proxy with data based on that which would be processed by the one or more respective portions of the application in place of which the proxy is invoked.

27. In the method of claim 26, the further improvement comprising transmitting data from the proxy to one or more further execution resources in connection with invoking those resources to perform functions which would otherwise be performed by the CPU executing the corresponding one or more portions of the application.

28. In the method of claim 27, the further improvement comprising applying data generated by a further execution resource to one or more further such execution resources.

29. In the method of claim 26, the further improvement comprising storing to a proxy data generated by a further execution resource which performed functions that would be performed by the CPU executing the one or more portions of the application in place of which that or another proxy was invoked.

30. In the method of claim 29, the further improvement comprising utilizing data contained in the proxy in connection with executing the remaining portions of the application on the CPU.

31. In a method of operating a digital data processing system having a plurality of execution resources, including a central processing unit (CPU) and one or more further execution resources, the improvement comprising
    executing a process on a central processing unit, the process (i) invoking a collection of proxy objects in place of a plurality of portions of an application, and (ii) executing remaining portions of the application on the CPU, where each proxy object corresponds to a respective portion of the application,
    dynamically selecting for invocation the collection of proxy objects in place of the plurality of portions of the application comprising functions that match the functional characterizations contained within a first store that comprises a functional characterization and at least one configuration characterization of each of the further execution resources,
    responding to invocation of the invoked collection to perform functions on the further execution resources in lieu of those which would otherwise be performed by the CPU executing corresponding portions of the application corresponding to the proxy objects in the collection in place of which those collections were invoked.

32. In the method of claim 31, the further improvement comprising invoking the proxy objects within a collection substantially simultaneously as a job stream.

33. In the method of claim 31, the further improvement comprising identifying adjacent proxy objects within a collection and establishing communications between those adjacent proxy objects in the collection.

* * * * *